US005596558A

United States Patent [19]
Arataki et al.

[11] Patent Number: 5,596,558
[45] Date of Patent: Jan. 21, 1997

[54] DATA REPRODUCING APPARATUS WITH CONTROLLED COMPARATOR FOR REDUCING CONNECTION ERROR OF MAIN DATA WITH CORRESPONDING ERROR CORRECTION DECODED DATA

[75] Inventors: Yuji Arataki; Shozo Masuda, both of Tokyo; Kenichi Kabasawa; Tohru Kadono, both of Saitama, all of Japan

[73] Assignee: Sony Corporation, Tokyo, Japan

[21] Appl. No.: 441,950

[22] Filed: May 16, 1995

Related U.S. Application Data

[63] Continuation of Ser. No. 11,192, Jan. 29, 1993, abandoned.

[30] Foreign Application Priority Data

Jan. 31, 1992 [JP] Japan .................................. 4-040660

[51] Int. Cl.$^6$ .................................................. G11B 20/18
[52] U.S. Cl. .................. 369/53; 369/54; 369/58
[58] Field of Search ............................ 369/53, 54, 58; 360/51, 53, 33.1; 358/335

[56] References Cited

U.S. PATENT DOCUMENTS

| | | | |
|---|---|---|---|
| 4,307,418 | 12/1981 | Mindel et al. | 369/53 X |
| 5,237,575 | 8/1993 | Maeda et al. | 371/40.1 |
| 5,278,815 | 1/1994 | Mashimo et al. | 360/48 X |

FOREIGN PATENT DOCUMENTS

| | | |
|---|---|---|
| 0138246A3 | 4/1985 | European Pat. Off. . |
| 0166785A1 | 1/1986 | European Pat. Off. . |
| 0249781A2 | 12/1987 | European Pat. Off. . |
| 0440224A2 | 8/1991 | European Pat. Off. . |
| 0496429A2 | 7/1992 | European Pat. Off. . |

OTHER PUBLICATIONS

Patent Abstracts of Japan, vol. 8, No. 33, P–254, Feb. 14, 1984, & JP 58–188315.
Patent Abstracts of Japan, vol. 9, No. 304, P–409, Nov. 30, 1985, & JP 60–136061.

*Primary Examiner*—Aristotelis Psitos
*Assistant Examiner*—Duncan Wilkinson
*Attorney, Agent, or Firm*—Limbach & Limbach L.L.P.

[57] ABSTRACT

A data reproducing apparatus reproduces a data recorded or medium which has auxiliary data added to main data subjected to an error correction coding process. The data reproducing apparatus includes a signal processor, a memory, a comparator and a controller. The signal processor separates the main data from the recording data read out from the recording medium to implement an error correction decoding process thereto. The memory means stores the decoded main data from the signal processor. The comparator compares the last data stored in the memory with the inputted main data to the memory. The controller controls write and read operations of the memory and controls the comparison condition of the comparator according to the main data from the signal processor.

14 Claims, 3 Drawing Sheets

DATA REPRODUCING APPARATUS WITH CONTROLLED COMPARATOR FOR REDUCING CONNECTION ERROR OF MAIN DATA WITH CORRESPONDING ERROR CORRECTION DECODED DATA

This is a continuation of application Ser. No. 08/011,192 filed on Jan. 29, 1993 now abandoned.

BACKGROUND

1. Filed of the Invention

The present of the invention relates to a data reproducing apparatus for reproducing main data from a data read out from a recording medium. More particularly, the present invention relates to a data reproducing apparatus using a memory which stores main data separated from data read out from a recording medium.

2. Background of the Invention

In general, in a recording and/or reproducing apparatus such as a tape recorder, a disc player or the like which records or reproduces digital audio signals or digital video signals on or from a recording medium, recording data has a main data such as digital audio data or digital video data or the like implemented by error correction processing or an interleaving processing and auxiliary data such as address information, control information or the like. For example, in a format of a so-called Compact Disc (CD), audio signals of stereo left and right channels are respectively sampled at 44.1 KHz to implement quantization of 16 bits thereto to form audio PCM signals. The audio PCM signals are provided to implement coding processing thereto using CIRC (Cross Interleave Reed-Solomon Code) to thereby provide the main data. The main data is further added to subcode data as auxiliary data including discrimination information showing whether data exits as music or between music pieces, and information such as the song numbers, an elapsed time of a music piece, an absolute time or the like, to thereby provide recording data to implement modulation based on such data to provide recording signals.

In the case of reproducing the recorded signals on a Compact Disc in the above-described format by using an ordinary reproducing apparatus such as a so-called Compact Disc Player, a clock component is detected from an EFM signal reproduced from the Compact Disc to carry out so-called reproduction of clock. The reproduction of clock is generally carried out by using a PLL (Phase Locked Loop) system. In this case, because the frame frequency of the recording data is 7.35 KHz, and one frame of an EFM recording signal is 588 channel bits, the frequency of the reproduction clock from the PLL system is 4.3218 MHz (=7.35 KHz×588). Binary data is taken into the reproducing system of the reproducing apparatus by the PLL system, and demodulation of the EFM signal is carried out. The EFM demodulated data ordinarily undergoes a decoding process including error correction or deinterleaving based on the CIRC by using a RAM for the decoding process. As a result, the EFM demodulated data is converted to a digital audio signal as a linear PCM signal. Data is written into the RAM for the decoding process in synchronism with a reproducing clock of the PLL system and data is read out from the RAM for the decoding process in synchronism with a reference clock generated from a reference oscillator such as a crystal oscillator. The digital audio PCM signal obtained by the decoding process is converted to an analog digital audio signal through a digital to analog (D/A) convertor and a low pass filter (LPF).

Meanwhile, generally in a data reproducing apparatus, particularly in an apparatus including an optical pickup as the above-described CD player, a servo control such as a focusing servo or a tracking servo of the optical pickup may be put out of order by a mechanical disturbance such as an impact, vibration or the like applied to the apparatus. As a result, the data reproducing apparatus fails to carry out normal data reproduction, and any convenience such as a sound break or other disturbance may take place. For this reason, there is provided in a data reproducing apparatus such that a buffer RAM of a relatively large capacity to read out data stored in the buffer RAM to compensate for an interruption of a reproduced signal such as the sound break even in the case where normal data cannot be obtained from the disc recording medium.

The above-described CD player or data reproducing apparatus, is required to read out the data from the buffer RAM in a burst manner where such an interruption occurs. A burst manner means that is read out from the buffer RAM in a predetermined data unit, at a high speed. In writing data into the buffer RAM, it is necessary to control the write address to allow the buffer RAM to store adjacent data in a continuous state. In this case, it is proposed that since an address such as time information is not added to the decoded processed main data as PCM data itself, the time information of subcode serving as auxiliary data is used to carry out write and/or read operations with respect the buffer RAM. In a more practical sense, for example, it is proposed to rotationally drive a disc at a rotational speed about twice or three-four times greater than the standard one to cut or clip data read out from the disc with subcoding frame, that is, block of subcode, length corresponding to 13.3 msec at the time of an ordinary reproduction, being as a unit to write it into the buffer RAM.

However, as above-described, since writing into the RAM for decoding process is executed in synchronism with the reproducing clock of the PLL system including so-called a jitter component owing to the unevenness of the rotation of the disc, whereas read out from the RAM for decoding process is executed by the reference clock from the crystal oscillator, a time difference corresponding to the jitter component exists between write data and read data with respect to the RAM for the decoding process. For this reason, if an attempt is made to carry out the write/read operation into and from the buffer RAM with main data being divided every subcoding frame, divisional points or delimiter points having reproducibility cannot be obtained because of the jitter. As a result, overlap or missing of write data into the buffer RAM may take place by the above-described jitter. That is, in such cases that adjacent main data are connected in the buffer RAM every subcoding frame, delimiter points having reproducibility cannot be provided as above-described, so sound skip and/or overlap of sound may take place.

In view of this, the applicant of this invention has already proposed, in the specification and drawings of the Japanese Patent Application No. 03-25566 from which priority was claimed now issued U.S. Pat. No. 5,237,575, a data reproducing apparatus adapted to reproduce main data obtained by implementing error correction coding process to digital data from the disc on which data including auxiliary information added every predetermined length of the main data is recorded. The data reproducing apparatus has a signal processor, a memory, a controller and a comparator. The signal processor separates the main data from the data read out from the disc and carries out an error correction processing. The memory subsquentially stores output data from the signal processor. The controller continuously outputs data stored in the memory. The comparator compares the data patterns before and after connecting portions of data subjected to the write and/or the read operation with respect to the memory to detect a coincidence. The apparatus continuously reproduces subsequent data at the time of the coincidence according to the compared result of the comparator. In accordance with this apparatus, since an approach is employed to make a comparison between data patterns at connecting portions of dealt in a memory as a RAM to connect subsequent data at the time when they coincide with each other, it is advantageously expected that overlap and/or missing of data will not take place.

In the case of applying the above-mentioned technology to the CD player, an approach is employed to reproduce data of the CD format in which auxiliary subcode information is added along with main PCM audio data subjected to error correction coding processing from the disc on which such data is recorded to control the write and/or read operations into and from the buffer RAM to make, in carrying out the decoding processing of the main data in the reproduced data, comparison between data patterns before and after connecting portions of data subjected to the write and/or read operations in the buffer RAM to detect a coincidence to continuously reproduce subsequent data at the time of coincidence. However, in the case where data interpolation is implemented by a defect formed on the disc or a disturbance or the like or the jitter value is very large by rolling or the like and therefore greatly deviates from a comparison window which is the range from which data patterns to be compared are taken out, coincidence may not hold by the above-described pattern comparison. As a result, continuous reproduction could not be carried out.

In addition, if the width of the comparison window is set to a broad value, in the case where patterns of the same data value continue, data values are apt to take the same value because the level of data is low and the effective bit number is small or in similar cases, there occurs the possibility a connecting error occurs such that data is connected at erroneous portions may take place.

SUMMARY OF THE INVENTION

It is, therefore, an object of the present invention to provide a data reproducing apparatus resolving the above-described problems.

It is another object of the present invention to provide a data reproducing apparatus to reduce occurrence of connecting errors and to prevent an error detection of data connecting portions.

According to the present invention, there is provided a data reproducing apparatus having a signal processor, a memory, a comparator and a controller. The signal processor separates main data from recorded data read out from a recording medium to implement an error correction decoding process thereto. The memory stores the decoded main data from the signal processor. The comparator compares last data stored in the memory with the main data inputted to the memory. The controller controls a write and a read operations of the memory and comparison condition of the comparator according to the main data from the signal processor.

In the above-described invention, the controller controls the comparison condition which is at least one of the comparison number, the comparison bit number and the comparison object range. As a result, the probability that any data connection may occur at an erroneous portion is reduced, whereby bad influence by connecting error is reduced.

BRIEF DESCRIPTION OF THE DRAWING

The invention will be more readily understood with reference to accompanying drawing, wherein.

DESCRIPTION OF THE INVENTION

Figure 1:
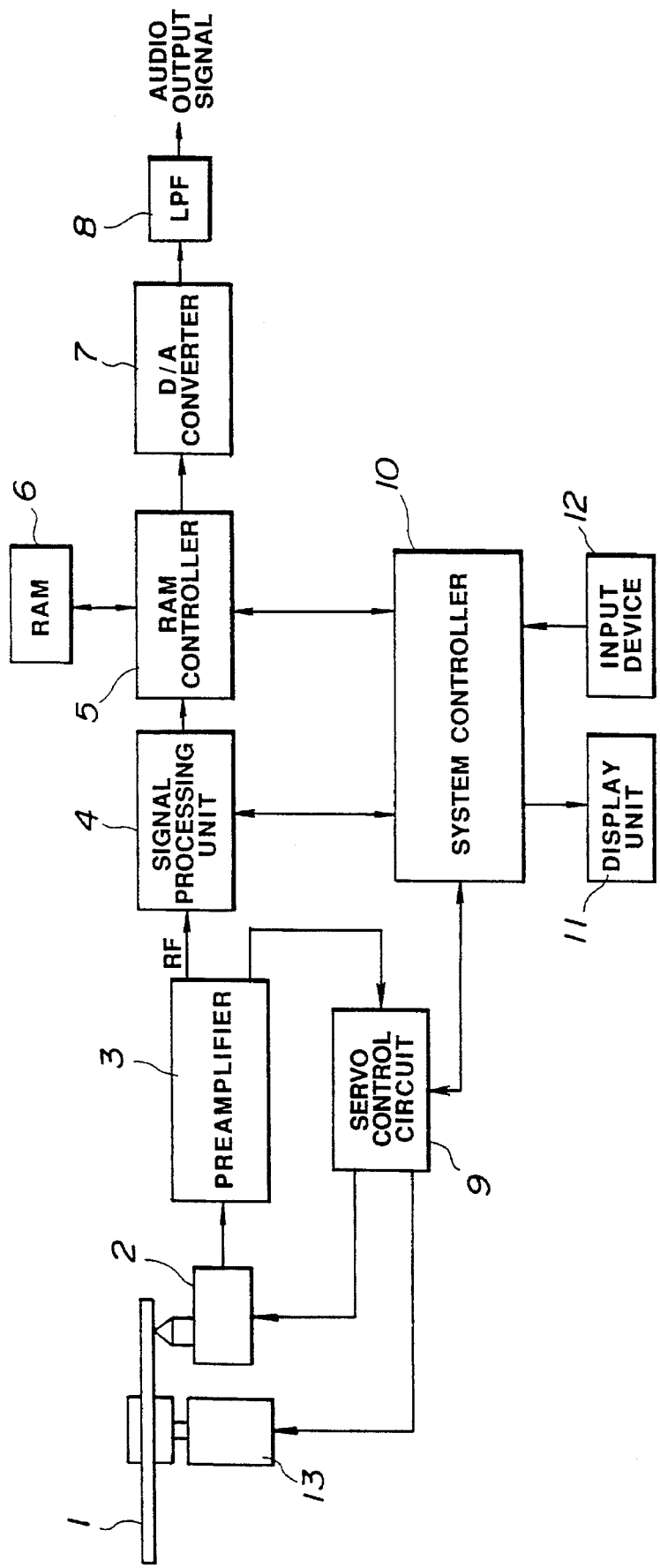
FIG. 1 shows a block diagram of the outline of the configuration of a data reproducing apparatus according to the present invention.

Referring to the drawings, the preferred embodiments of the present invention will be explained in detail.

FIG. 1 shows a block diagram of the outline of the configuration of a data reproducing apparatus of an embodiment according to the this invention is applied to so-called a Compact Disc (CD) player. An optical disc 1 is recorded recording data in a so-called CD format. The above-described CD format will now be briefly described. Respective eight bits of the higher order and the lower order of digital audio data of the PCM system where one word is 16 bits are separated, and are assumed as a symbol serving as the error correction coding unit. Addition of error correcting parity and an interleaving processing are implemented thereto by so called a CIRC (Cross Interleave Reed-Solomon Code). Main data which has 32 symbols in total 24 symbols of the CIRC encoded audio data and 8 symbols of parity serve as one recording unit or one frame. The main data is added a subcode as auxiliary data of 8 bits. The main data added to subcode is modulated by an EFM (eight to fourteen modulation) system. A frame synchronization (SYNC) pattern is added to the modulated data. As a result, the main data is converted an EFM signal where on e frame is 588 channel bits. The EFM signal is recorded onto the optical disc 1. The above-described subcode is adapted so that one block, which is so-called subcoding frame, is formed by 98 frames, and serves to bear auxiliary information of 8 channels of P to W. In the Q channel of this subcode, auxiliary data such as a music number, an index number, an elapsed time in a music, and an absolute time or the like are included.

An optical pickup 2 has a light beam source, a photodetector, an objective lens and an optical system. The optical pickup 2 is irradiated to the light beam to the optical disc 1 and receives the light beam reflected by the optical disc 1. The irradiated beam is focused on the optical disc 1 by the objective lens of the optical pickup 2. The optical pickup 2 is transferred by a transfer device, not shown, in the radial direction of the optical disc 1. An output signal from the optical pickup 2 is supplied to a preamplifier 3. The preamplifier 3 amplified the output signal from the optical pickup 2. The output signal from the preamplifier 3 is implemented signal processing such as EFM decoding, deinterleaving, error correction, interpolation, decoding of subcode or the like by a signal processor 4. The main data outputted from the signal processor 4 is supplied to a buffer RAM 6 via a RAM controller 5. The RAM controller 5 is controls a write and a read operations of the RAM 6 later explained. The main data is stored in the RAM 6 intermittently or the burst manner. The data read out from the RAM 6 is supplied to a digital to analog (D/A) converter 7. The D/A converter 7 is converted the read out data from the digital signal to the analog signal. The output analog signal from the D/A converter 7 is outputted thorough a low pass filter (LPF) 8 as an analog audio signal. A servo control circuit 9 is applied to the output signal from the preamplifier 2 and generates error signals such as a focusing error signal, a tracking error signal and the other like. The servo control circuit 9 further includes a focusing servo circuit, a tracking servo circuit, a spindle servo circuit, a sled servo circuit such as a optical pickup transferring servo and the other like and controls the optical pickup 2, the transfer device and a spindle motor 13. The objective lens of the optical pickup 3 is focusing controlled by the focusing servo circuit so that the focusing error signal becomes equal to zero. The objective lens of the optical pickup 3 also is tracking controlled by the tracking servo circuit so that the tracking error signal becomes equal to zero. The spindle servo circuit controls the rotational speed of the spindle motor 13 so that the optical disc 1 is rotated by the spindle motor 13 at a predetermined linear velocity, for example, a linear velocity which is twice grater than a standard linear velocity. In addition, the movement of the optical pickup 2 in the radial direction of the optical disc 1 is controlled by the sled servo circuit so that the optical pickup is placed at a target track or an objective track of the optical disc 1 designated by a system controller 10. The servo control circuit 9 is outputted data indicating state of respective units controlled by the servo control circuit 9 to the system controller 10.

The system controller 10 includes a CPU (Central Processing Unit) such as a microprocessor for controlling the operation of respective units, a ROM (Read Only Memory) stored a control program executing at the CPU in advance, a RAM (Random Access Memory) adapted so that various data are written thereinto and read out therefrom and are temporarily stored therein and an I/O (Input/Output) circuit for carrying out transmission and reception of various data between the CPU and external circuits. The system controller 10 is connected to a display unit 11 and an input device 12 such as a keyboard. The display unit 11 displays operating states of respective units and may be used a LCD (Liquid Crystal Display), a LED (Light Emitting Diode) display device, a FL display unit, a plasma display unit or the like. The input device 12 designates various operations and has various operation keys, for example, a reproducing button, a stop button, a fast-feed button or the like. In addition, the system controller 10 carried out transmission and reception of signals between the system controller 10 and the signal processor 4 and the RAM controller 5 to control the operations of the signal processor 4 and the RAM controller 5.

In FIG. 1, the optical disc 1 is rotationally driven at a rotational speed or a linear velocity, for example, a twice rotational speed or twice linear velocity, higher than the standard rotational speed or the standard linear velocity by the spindle motor 13, and data is read out from the optical disc 1 intermittently or in the burst manner by the optical pickup 2. The read out data from the optical disc 1 is applied to the preamplifier 3 and is amplified by the preamplifier 3. The output signal from the preamplifier 3 as an RF signal is applied to the signal processor 4. The RF signal is a signal modulated by the above-described EFM system. At the signal processing unit 4, the above-described processing are implemented to the RF signal. Its main data as audio PCM data is stored into the buffer RAM 6 through the RAM controller 5. The data transfer rate up to this stage is a rate higher than the standard reproduction rate, for example, twice rate in dependency upon the high speed disc rotational drive. It is to be noted that reading of data from the optical disc 1 is carried out intermittently or in so called the burst manner. For this reason, even if an instantaneous data transfer rate is higher than the standard transfer rate, the average rate including a reading idle time as well is equal to substantially the standard reproducing transfer rate. The data applied intermittently or in the burst manner to the buffer RAM 6 and stored thereinto are continuously read out at the standard reproducing transfer rate by the RAM controller 5. The data thus read out is caused to be through the D/A converter 7 and the LPF 8, whereby it is taken out as an analog audio signal.

Here, in the case where there occurs a cause such that the servo system of the data reproducing apparatus is disturbed by disturbance, etc., so a reproduced signal is interrupted, viz., in practical terms, for example, a) in the case where there occurs a state out of focus, b) in the case where subcode Q data becomes discontinuous, c) in the case where the PLL system becomes unstable for more than a fixed time, d) in the case where interpolation processing is carried out, namely, a flag for interpolation is raised or set, or in similar case, the system controller 10 monitors such phenomenon to interrupt writing into the buffer RAM 6. After the system controller 10 allows the servo system of the data reproducing apparatus to be normal, the optical pickup 2 is accessed to the address of the optical disc 1, for example, an address immediately before a reproduced signal is interrupted, and restart writing the readout data in the buffer RAM 6 from that address. Thus, as long as data stored in the buffer RAM 6 does not become empty, continuous reproduced outputs will be obtained. In addition, also in the case where the quantity of data stored in the buffer RAM 6 fully becomes equal to the capacity of the RAM 6, the system controller 10 once interrupts writing into the RAM 6, and the operating mode of the data reproducing apparatus is changed to a pause mode.

Meanwhile, the RF signal inputted to the signal processor 4 is synchronous with a PLL system clock including unevenness of the rotation of the optical disc 1. The main data outputted to the RAM controller 5 is synchronous with a reference clock such as a crystal system clock. Any jitter exists between the RF signal and the main data. For this reason, if the timing to start writing into the buffer RAM 6 is caused to be dependent upon the absolute time obtained by decoding process so-called the subcode Q data in the signal processor 4, a connecting error such as missing or overlap of data or the like may take place. As a result, there is employed a configuration such that a data comparison block is provided in the RAM controller 5 to compare last main data of about several samples written in the buffer RAM 6 with main data applied to the RAM 6 through the RAM controller 5 from the signal processor 4 to write data from the signal processor 4 into the buffer RAM 6 at the timing where these data coincide with each other.

Figure 2:
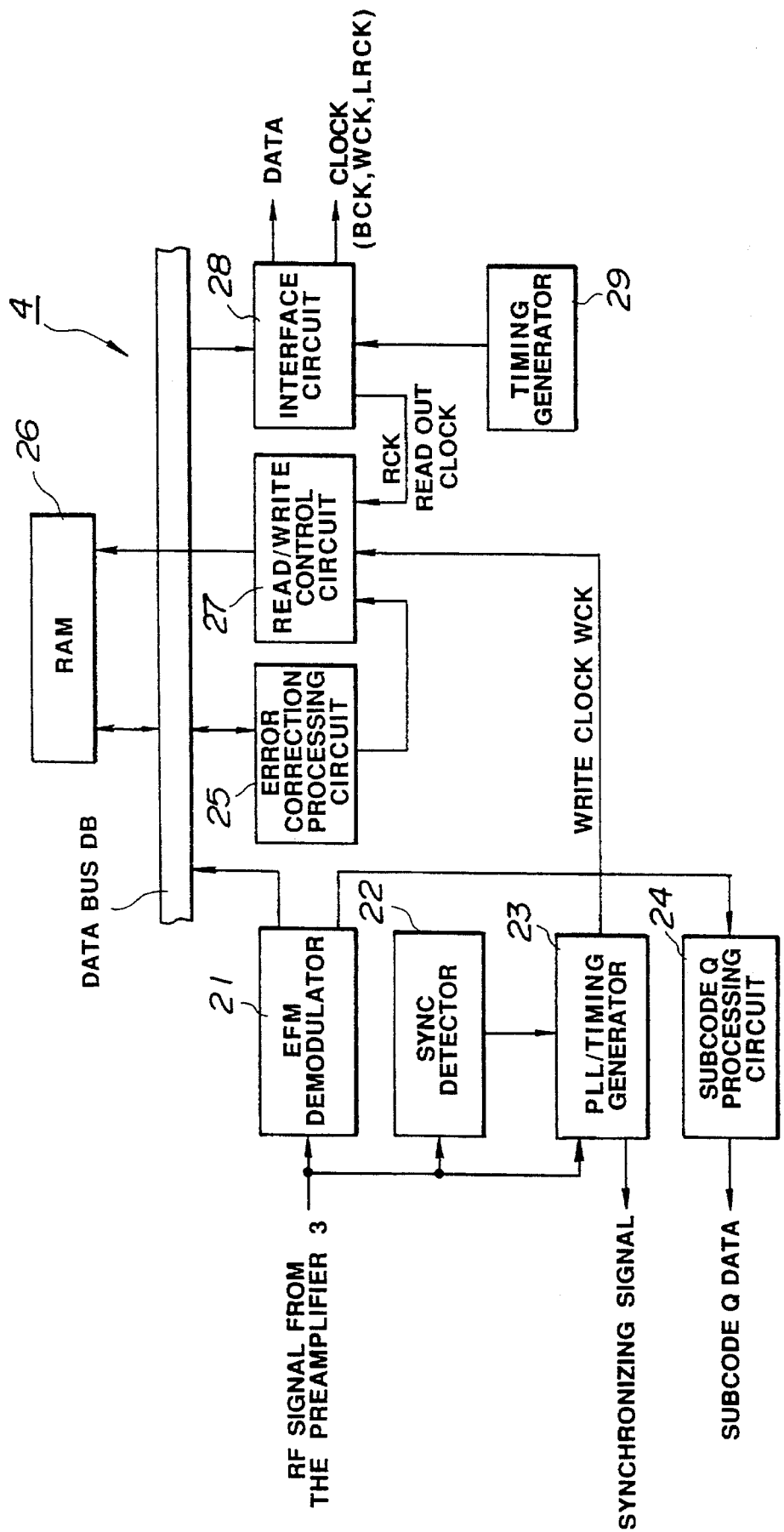
FIG. 2 shows a circuit block diagram of an actual example of a signal processor of the present of the invention.
Figure 3:
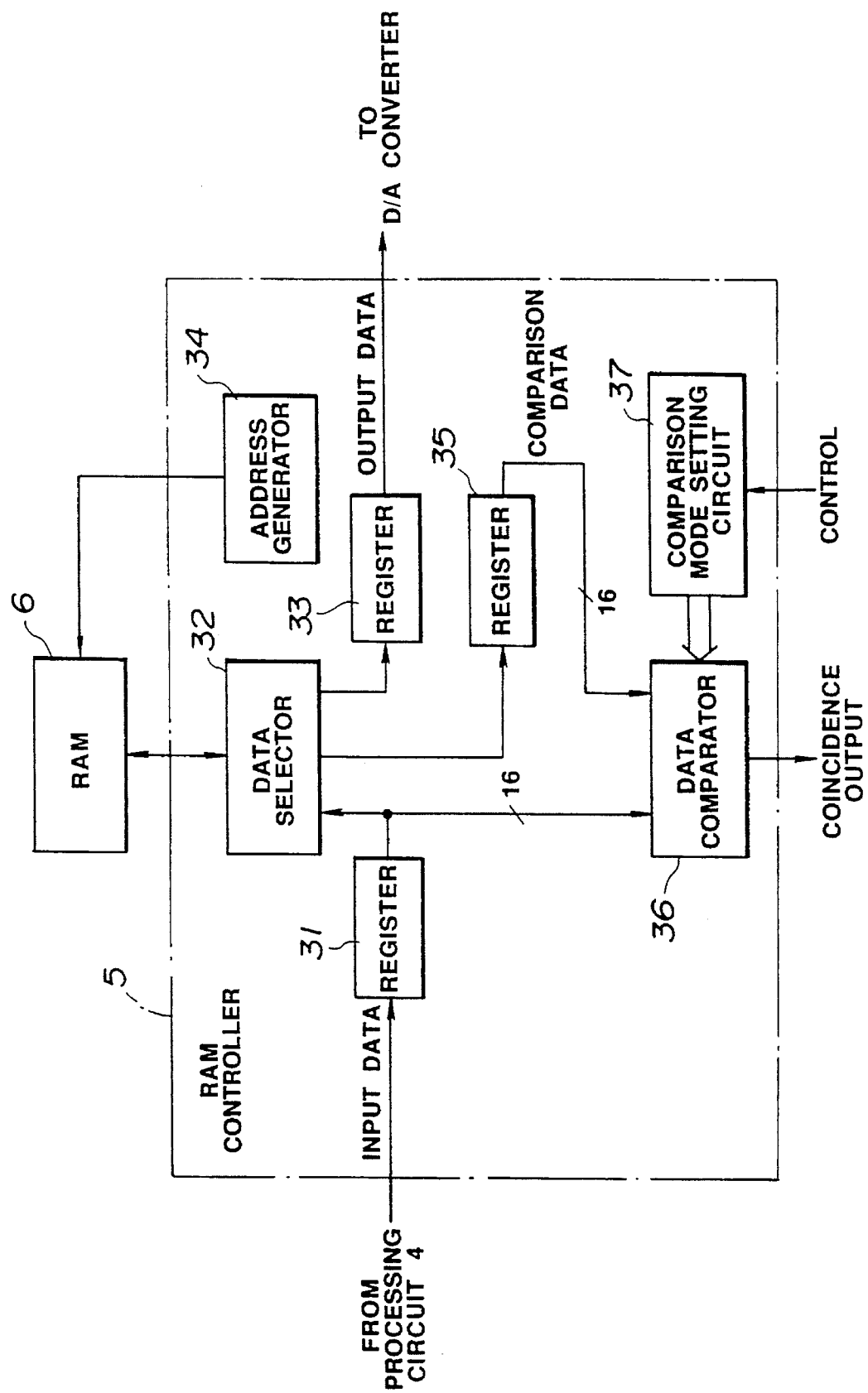
FIG. 3 shows a circuit block diagram of an actual example of a RAM controller and the peripheral circuit in the present invention.

Namely, an actual example of the signal processor 4 is shown in FIG. 2, and an actual example of the RAM controller 5 is shown in FIG. 3.

In FIG. 2, the RF signal from the preamplifier 3 is applied to each of an EFM demodulator 21, a synchronization (SYNC) detector 22, and a PLL/timing generator 23. The EFM demodulator 21 demodulates the RF signal which is modulated by the EFM system and applies the main data to the a data bus DB, and applies to the subcode data to a subcode Q processing circuit 24. The SYNC detector 22 detects a subcoding frame synchronizing signal to applied to the PLL/timing generator 23. The PLL/timing generator 23 detects a channel bit clock as EFM clock component of the RF signal to allow the PLL to be in a lock state, and to generate a word clock, or a bit clock or the like of EFM demodulated data by frequency-dividing the above-described channel bit clock by making use of the subcoding frame synchronizing signal, or any other means, thus to applied write clock WCK to a read/write control circuit 27. Further, a subcoding frame synchronizing signal is outputted from the PLL/timing generator 23, and is used the spindle servo. The subcode Q data is serially outputted from the subcode Q processing circuit 24, and is used as current position data of the optical pickup 2 on the optical disc 1.

The main data including audio data and parity data for error detection and correction applied from the EFM demodulator 21 to the data bus DB is written into a RAM 26 for decoding processing by a read/write control circuit 27 in synchronism with a write clock WCK, which is included a jitter component by unevenness of rotation or the other of the optical disc 1, from the PLL/timing generator 23. Thereafter, while a read/write operation with respect to the decoding processing RAM 26 is being controlled by the read/write control circuit 27, error detection/correction processing or deinterleaving processing by an error correction processing circuit 25 is implemented on the basis of the CIRC. The decoding processing RAM 26 has a capacity to an extent such that a predetermined margin, for example, ±24 frames for absorbing the above-described jitter is ensured in addition to a capacity required for the CIRC decoding process, for example, about 108 frames, and, for example, a 32k bit RAM is used for the decoding processing RAM 26. The decoding processed main data as PCM data is read out from the decoding processing RAM 26 by the read/write control circuit 27 in synchronism with a readout clock RCK from a timing generator 29 provided with a reference oscillator such as a crystal oscillator, and is then applied to an interface circuit 28. The decoding processed main data and various clocks such as a bit clock BCK, a word clock WDCK, and a clock LRCK for switching stereo left and right channel words, etc. are outputted from an interface circuit 28, and are applied to the RAM controller 5 and/or the system controller 10, etc. In this instance, the above-described write and/or read operation is intermittently carried out at a rate higher than the standard rate, for example, twice rate.

In FIG. 3, input data from the interface circuit 28 of the above-described signal processor 4 is applied to a resister 31 and is stored in the resister 31 as PCM data where one sample is 16 bits. When the system controller 5 permits data to be written in the buffer RAM 6, the input data is written in the buffer RAM 6 according to a write address outputted from an address generator 34 through a data selector 32. At this time, data is intermittently written at a transfer rate higher than the standard transfer rate. Readout of data is carried out as follows. Namely, data are taken into a register 33 through the data selector 32 from the buffer RAM 6 according to a readout address outputted from the address generator 34, and are continuously outputted from the register 33 at a fixed reproduction transfer rate corresponding to a sampling frequency, for example, 44.1 KHz. The data outputted from the resister 33 is supplied to the D/A converter 7.

Here, when writing data into the buffer RAM 6 as previously described is once interrupted, and writing the data into the buffer RAM 6 is restarted later, namely, data connection is carried out, an address when data is last written into the buffer RAM 6 is outputted from the address generator 34. The data of that address is taken into a register 35 through the data selector 32 from the buffer RAM 6. This data is compared with data inputted from the signal processor 4 to the register 31 at a data comparator 36. When both data coincide with each other, a coincidence output is supplied to the system controller 10 and the timing of data connection is determined by the system controller 10. Namely, it is sufficient to write, into the buffer RAM 6, data in order from input data from the signal processor 4 subsequently to the timing at which the coincidence output is obtained.

Meanwhile, if the number of comparison samples at the time of comparing data from the register 31 and data from the register 35 to detect coincidence therebetween is less, there increases the possibility that data may be connected at an erroneous position. On the contrary, if the number of comparison samples is too great, in the case where any interpolated data is included in data sample being compared, there is no guarantee in that the value of last interpolated data, namely, the value of data in the case where interpolated data obtained by interpolating calculation last time is stored into the buffer RAM 6 and is read out therefrom, and the value of current interpolated data value, namely, the value of data in the case where interpolated data obtained by interpolating calculation this time at the signal processing unit 4 and is taken into the register 31, become equal to each other. For this reason, when an error in calculation, etc. occurs, so the values of respective interpolated data differ from each other, coincidence fails to be detected, resulting in the fact that data connection cannot be made. That is, in order to prevent an erroneous detection of the connecting position, it is desirable that the number of comparison samples is great, but there is the possibility that in the case where the reliability of such data to include interpolated data is low, if the number of comparison samples is great, coincidence might fail to be detected.

Further, with respect to the comparison window width, namely, the range of data from which comparison samples are taken out in order to carry out the comparison, it is necessary to take a sufficiently wide value for the above-described jitter quantity. However, if the comparison window is set too broad, in the case where continuous patterns or repetitive patterns appear in data, particularly in the case of a signal having a pattern mathematically or artificially formed such as a test digital signal or in similar cases, patterns of the same digital values may appear at a plurality of portions. As a result, detection of coincidence may be determined at an erroneous position.

In addition, since the probability that data values of arbitrary two samples where one word is 16 bits, namely, all digits of 16 bits become equal to each other is $2^{-16}$ (=1/65536), and the probability that two patterns included n samples become equal to each other is $2^{-16n}$, when the fact that the range where samples to be compared are taken out is limited to a range to an extent of deviation due to the above-described jitter by the subcode Q data is taken into consideration, it is possible to detect a connecting position with high accuracy by comparing about several samples. However, when the signal level becomes very low level, so the effective bits of samples of 16 bits are an extent of several bits on the lower order side, the probability that samples take the same data value substantially becomes high, and the probability that the same patterns may appear at different positions also becomes high.

In view of the above-described respective points, in the case where the quality or reliability of data read from the optical disc 1 is high, it is desirable that the number of comparison samples is great and the comparison window width is narrow. On the contrary, in such cases that the quality or the reliability of data is low, so interpolation is carried out, setting is effective such that the number of comparison samples is reduced, or the number of comparison bits is limited to the higher order bits. Further, when the quantity of jitters resulting from unevenness of rotation of the disc, or the like is large, it is necessary to widen the comparison window width. In view of this, an approach is employed to set in advance several variations or modes with respect to the comparison condition in the data comparator 36, for example, comparison bit length, comparison sample number, and comparison window width to sequentially switch those variations or modes by making use of software or hardware, or to select one of variations or modes of these comparison conditions in dependency upon the quality or reliability of data read from the optical disc 1, or the jitter quantity thereof, etc. An example thereof is shown in Table 1.

TABLE 1

| MODE | COMPARISON BIT LENGTH | COMPARISON SAMPLE NO. | COMPARISON WINDOW WIDTH |
|---|---|---|---|
| 1st. | 16 BITS | 4 SAMPLES | ±4 FRAMES |
| 2nd. | 16 BITS | 4 SAMPLES | ±28 FRAMES |
| 3rd. | 16 BITS | 2 SAMPLES | ±28 FRAMES |
| 4th. | HIGHER ORDER 12 BITS | 2 SAMPLES | ±28 FRAMES |
| 5th. | — | — | — |

In the actual example of this Table 1, five variations or modes are prepared. In the first mode, setting is made such that the comparison bit length is 16 bits, the comparison sample number is 4 samples, and the comparison window width is ±4 frames. In the second mode, setting is made such that only the comparison window width is changed to ±28 frames with respect to various conditions of the first mode. In the third mode, setting is made such that the comparison sample number in the respective conditions of the second mode is reduced to two samples. In the fourth mode, setting is made such that the comparison bit length in the respective conditions of the third mode is reduced to 12 bits of the higher order. In the fifth mode, an approach is employed to connect data, without carrying out the above-described comparison operation, in dependency upon only time information of the subcode Q data by tolerating overlap or missing of data. These comparison modes are set and controlled by a comparison mode setting circuit 37, and a control to selectively switch the comparison mode to a desired one is carried out by a control signal from the system controller 10. It is to be noted that an approach may be employed to allow the comparison mode setting circuit 37 to be a portion of the function of the system controller 10 without providing it in the RAM controller 5 to carry out switching control of the comparison mode at the data comparator 36 directly from the system controller 10.

As an algorithm for selection of such comparison modes, when an attempt is made to first make data connection, the comparison mode of the data comparator 36 is set to the first mode. When the above-described coincidence is not detected within a determined comparison window by the data comparator 36, setting of the comparison mode of the data comparator 36 is changed to the second mode in which the comparison window is widened to carry out detection of coincidence for a second time. Similarly to the above, until coincidence is detected, the comparison mode of the data comparator 36 is switched in succession to the third mode and the fourth mode. In the case where coincidence is not yet detected, the fifth mode is selected to enter a data write operation from an address based on the subcode Q data.

Further, an approach may be employed to detect the quality or reliability of data which has read from the optical disc 1 by using any methods, for example, a method for detecting a disturbance vibration by a sensor, a method for detecting to detect the jitter quantity or method for detecting presence or absence of the interpolation processing, thus the comparison mode of the data comparator 36 may be selected according to the result of the above-described method. For example, in the case where the interpolation processing is carried out, it is sufficient to start the operation from the third mode to carry out switching to the fourth or the fifth mode until coincidence is detected.

In addition, it is preferable to employ an approach, in common to the above-described comparison mode select algorithm, or independently thereof, to monitor a residual or remaining capacity of data stored in the buffer RAM 6 to carry out detection of coincidence, the data comparator 36 detects the coincidence in the rigorous comparison condition such as the first or the second modes when there is a margin in the residual of the data stored in the buffer RAM 6. If there is not a margin in residual of the data stored in the buffer RAM 6, the data comparator 36 detects the coincidence in the gentle comparison condition such as in the third or the fourth modes. If there is not a margin in the least, the data comparator 36 detects the coincidence in the fifth mode, and it is immediately start to write the data outputted from the signal processor 4 in the buffer RAM 6 according to the result of the data comparator 36. This approach is effective in order to prevent such an inconvenience that if it takes much time in detection of the data connecting position when returning from turbulence, etc. of the servo by disturbance is delayed, so the data residual of the buffer RAM 6 becomes small, data from the RAM 6 are all read out, resulting in the possibility that a sound break may occur in a final reproduced signal.

In accordance with an embodiment of this invention as described above, even in the case where the quality of main data separated from data read out from the optical disc 1 is lowered by a main cause such as scratch formed on the disc or unevenness in rotation or the other primary factor, it is possible to execute the write and/or the read operation every block such as subcoding frames with the connecting error being suppressed as small as possible. As a result, it is possible to provide a data reproducing apparatus such as a CD player, resistant to disturbance such as vibration, etc. This data reproducing apparatus is suitable particularly when applied to small portable equipments.

It is to noted that this invention should not be considered to be limited only to the above-mentioned embodiment. For example, as the recording medium, a magneto-optical disc, a magnetic disc, and a magnetic tape, etc. may be used in addition to an optical disc. It should be also noted that the format is not limited to so called a CD format. Further, video data or compression processed data, etc. may be used as the above-described main data in addition to PCM audio data. Furthermore, it is a matter of course that various comparison conditions or comparison modes are not limited to those in the embodiment, and that the hardware configuration is also not limited to the example shown.

What is claimed is:

1. A data reproducing apparatus for reproducing recording data from a recording medium, the recording data having auxiliary data appended to main data, the main data having been previously subjected to an error correction coding process, said apparatus comprising:

signal processing means for separating the main data from the recording data, reproduced from the recording medium, for implementing an error correction decoding process on the separated main data to generate decoded main data, the decoded main data characterized by a reliability;

memory means for storing the decoded main data;

data reliability determining means for determining the reliability of the decoded main data;

comparing means for comparing a first data pattern, of the last decoded main data previously stored in the memory means, with a second data pattern, of decoded main data to be next stored into the memory means; and first control means for controlling write operations into the memory means and read operations from said memory means; and second control means for controlling a comparison condition of the comparing means according to the determined reliability of the decoded main data.

2. A data reproducing apparatus according to claim 1, wherein the control means comprises comparing mode setting means for setting the comparison condition of the comparing means which is at least one of the number of comparison samples, the number of comparison bits and the comparison object range.

3. A data reproducing apparatus, for reproducing recording data from a recording medium, the recording data having auxiliary data appended to main data, the main data having been previously subjected to an error correction coding process, the apparatus comprising:

signal processing means for separating the main data from the recording data, reproduced from the recording medium for implementing an error correction decoding process on the separated main data to generate decoded main data;

memory means for storing the decoded main data;

means including comparing means for comparing, with a data pattern of decoded main data previously stored in the memory means, a data pattern of decoded main data to be next stored into the memory means and for determining a timing of data connection according to the comparison; and control means for controlling a write operation or a read operation of the memory means and comparison condition of the comparing means, wherein the control means controls the comparison condition of the comparing means according to an amount of decoded main data stored in the memory means.

4. A data reproducing apparatus according to claim 3, wherein the control means comprises comparison condition setting means for setting the comparison condition of the comparing means which is at least one of the number of comparison samples, the number of comparison bits and the comparison object range.

5. A data reproducing apparatus according to claim 3, wherein the means for determining the timing of data connection comprises a first register for storing the decoded main data to be next stored into the memory means and a second register for storing the main data read previously stored into the memory means, wherein the main data stored in the first register and the main data stored in the second register are supplied to the comparing means.

6. A data reproducing apparatus according to claim 2, wherein the second control means controls the comparing modes setting means so as to decrease the number of comparison samples as the determined reliability of the decoded main data increases.

7. A data reproducing apparatus according to claim 2, wherein the second control means controls the comparing modes setting means so as to lower the number of comparison bits as the determined reliability of the decoded main data increases.

8. A data reproducing apparatus according to claim 2, wherein the second control means controls the comparing modes setting means so as to increase the number of comparison samples as the determined reliability of the decoded main data decreases.

9. A data reproducing apparatus according to claim 2, wherein the second control means controls the comparing modes setting means so as to expand the comparison object range as the determined reliability of the decoded main data decreases.

10. A data reproducing apparatus according to claim 2, wherein the second control means controls the comparing modes setting means according to an amount of decoded main data in the memory means.

11. A data reproducing apparatus according to claim 2, wherein the data reliability determining means determines the reliability of the decoded main signal according to a jitter condition of the main data.

12. A data reproducing apparatus according to claim 1, wherein the data reliability determines the reliability of the decoded main data by detecting a signal level in the decoded main data.

13. A data reproducing apparatus according to claim 1, and further including a vibration sensor that detects vibrations of the data reproducing apparatus, wherein the data reliability determining means determines the reliability of the decoded main data in response to the vibration sensor.

14. A data reproducing apparatus according to claim 1, and further including interpolation means that interpolates the decoded main data, wherein the data reliability determining means determines the reliability of the decoded main data in response to an amount of interpolation of the decoded main data by the interpolation means.

* * * * *